Jan. 7, 1958  A. L. LINDOW ET AL  2,819,381
METHOD OF WELDING
Filed April 14, 1955

INVENTORS
ARTHUR L. LINDOW
BY IAN R. SUTHERLAND

ATTORNEY

2,819,381
METHOD OF WELDING
Arthur L. Lindow, Northfield, and Ian R. Sutherland, Solon, Ohio, assignors to The Cleveland Pneumatic Tool Company, Cleveland, Ohio, a corporation of Ohio
Application April 14, 1955, Serial No. 501,398
3 Claims. (Cl. 219—104)

This invention relates to welding and more particularly to a new and improved method of upset welding which uniformly produces a high strength weld between two members.

It is an important object of this invention to provide a new and improved method of welding two members together which method will consistently produce a weld plane of superior strength and quality.

It is another object of this invention to provide a method of welding wherein the final weld plane will be free of penetrators and of superior strength.

It is another object of this invention to provide a method of upset welding wherein the two members to be welded are plated with a surface metal which insures intimate contact during the welding operation, thus reducing the possibility of penetrators and the like.

It is another object of this invention to provide a method of upset welding wherein the pieces to be welded are plated with a ductile conductor that insures intimate contact during the welding operation which conductor has the properties of alloying with the pieces welded to improve their strength characteristics.

It is still another object of this invention to provide a method of upset welding wherein the pieces to be welded are first plated with an oxide resistant metal which protects the surface of the pieces and prevents oxidation thereof prior to and during the welding operation.

Further objects and advantages will appear from the following description and drawings, wherein.

Figure 1:
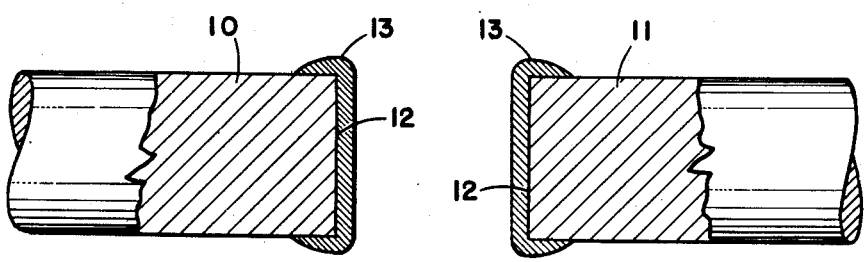
Figure 1 is a fragmentary longitudinal section of two pieces prepared for welding by a method according to this invention.

In a method of welding according to this invention, two pieces 10 and 11, which are normally a ferrous metal, are squared off to provide smooth end surfaces 12. The ends of each of the pieces 10 and 11 are then plated with nickel to form a coating or jacket 13 covering the end surfaces 12 and the portions of the pieces immediately adjacent thereto. Although the jackets 13 are exaggerated in the drawings for the purpose of illustration, they should be between 0.002 and 0.0002 inch thick; however, a greater thickness of nickel will merely produce a higher alloy concentration along the weld plane. In order to obtain a proper weld, it is necessary that the surface 12 be chemically cleaned. Any of the conventional nickel plating processes may be utilized as long as it provides a clean bond between the nickel and the base metal of the pieces 10 and 11. Nickel is preferably used for the coating 13 because it is relatively immune to oxidation in that it forms a very thin adherent oxide coating which protects the underlying metal. When the two pieces are brought into engagement as shown in Figure 2 with an axial force urging the two pieces 10 and 11 toward each other, an intimate contact will be provided between surfaces of the nickel 13 even if there are small irregularities in the surface because nickel is soft and will deform easily under pressure.

Figure 2:
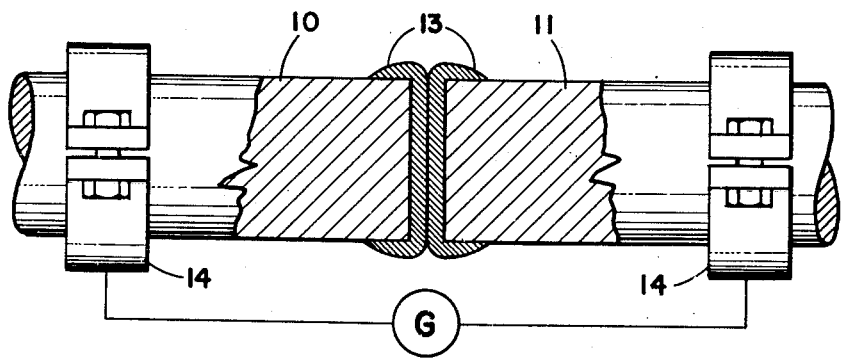
Figure 2 is a fragmentary longitudinal view showing the pieces to be welded abutting each other prior to the application of the heating current; and, Figure 3 is a fragmentary longitudinal view of a completed weld according to this invention.
Figure 3:
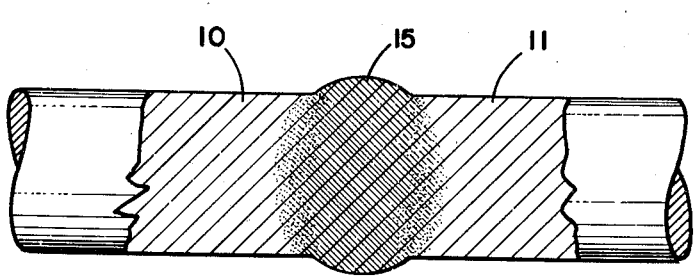

Die clamps 14 are utilized to secure the two pieces 10 and 11 in the clamped position as shown in Figure 2 as well as to provide electrical connection between a source of electrical power G and the pieces 10 and 11. The source of electrical power may be a generator or any suitable mechanism which will supply controlled current to the two pieces. A low current density is passed through the two pieces 10 and 11 and the jackets 13 which heats the jackets and the portions of the pieces 10 and 11 adjacent thereto. It should be understood that the heating will be concentrated at the point of welding due to the higher resistance present along the surface of engagement between the surface of the jackets 13 and along the surfaces 12. The current is passed through the pieces until the base metal becomes plastic at which time there will be a diffusion of the nickel into the base metal of the pieces 10 and 11 and a fusion of the entire joint until a weld of the type shown in Figure 3 is completed. During this entire heating process the axial force on the two pieces 10 and 11 is maintained urging them toward each other so that a mild form of upsetting occurs at 15.

Nickel is preferred as the coating metal because of its ductile qualities and because it improves the properties of a ferrous metal when it fuses therewith. It also prevents troublesome oxidation because only a very thin layer of oxide forms which protects the remaining nickel.

Although a preferred embodiment of this invention is illustrated, it will be realized that various modifications may be made without departing from the mode of operation and the essence of the invention. Accordingly, the appended claims and not the aforesaid detailed description are determinative of the scope of the invention.

We claim:

1. A method of upset welding two pieces of metal comprising forming complementary surfaces on each of said pieces, plating said surfaces with nickel, pressing said plated surfaces together with a sufficient force to upset the nickel and produce intimate contact over the entire area of engagement therebetween, and thereafter passing an electrical current between said pieces while they are pressed together thereby heating said nickel and the portions of said pieces adjacent thereto until they weld together and the nickel fuses into the pieces.

2. A method of upset welding two pieces of metal comprising forming complementary surfaces on each of said pieces, plating said surfaces with nickel to a thickness between two thousandths and two ten-thousandths of an inch, pressing said plated surfaces together with a force sufficient to upset the nickel and produce intimate contact over the entire area of engagement therebetween, and thereafter passing an electrical current between said pieces while they are pressed together thereby heating said nickel and the portions of said pieces adjacent thereto until they weld together and the nickel fuses into the pieces.

3. A method of upset welding two pieces of metal comprising forming complementary surfaces on each end of said pieces, plating said surfaces with a metal having substantially the physical characteristics of nickel, pressing said plated surfaces together with a sufficient force to upset said metal and produce intimate contact over the entire area of engagement therebetween, and thereafter passing an electric current between said pieces while they are pressed together thereby heating said metal and the portions of said pieces adjacent thereto until they weld together and said metal fuses into the pieces.

References Cited in the file of this patent

UNITED STATES PATENTS

| | | |
|---|---|---|
| 2,003,467 | Randolph et al. | June 4, 1935 |
| 2,327,259 | Gay | Aug. 17, 1943 |
| 2,356,854 | Kirk | Aug. 29, 1944 |
| 2,757,269 | Harrick | July 31, 1956 |